Figure 1:
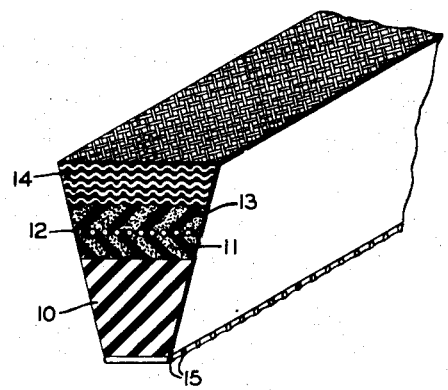

June 23, 1953     A. L. FREEDLANDER     2,642,751

V BELT

Filed Oct. 1, 1949

INVENTOR.
A. L. FREEDLANDER

BY

HIS ATTORNEY

Patented June 23, 1953

2,642,751

UNITED STATES PATENT OFFICE 2,642,751

V BELT

Abraham Lincoln Freedlander, Dayton, Ohio, assignor to The Dayton Rubber Company, a corporation of Ohio Application October 1, 1949, Serial No. 119,110

3 Claims. (Cl. 74—233)

The present invention relates to an improvement in V-belts and their method of manufacture. It relates more particularly to an improved V type raw edge belt made of rubber.

Raw edge rubber belts have been manufactured in accordance with methods described by Freedlander in his Patents #1,611,830 and #1,700,999, and numerous other patents drawn to modifications or improvements thereof. In these methods a belt sleeve is generally built upon a drum in a plurality of layers, the sleeve is wrapped and cured under pressure, and the vulcanized sleeve is then cut into belt lengths having V cross sections. These belts are characterized by the fact that they are not wrapped and possess "raw" edges. Preferably the belt body is composed of a bottom compression section, an intermediate neutral axis section, and a top tension section. The tension layer is generally comprisesd of a plurality of layers of rubberized bias-laid fabric, while the neutral axis section comprises one or more layers of longitudinally extending parallel cords spaced from the adjacent section by cushion layers of rubber. The bottom or compression section may comprise rubber alone, or rubber-fiber mixtures commonly known as "Stiflex." In these mixtures the fiber is present in minor proportions by weight. The body of the belt is of considerable depth or thickness and the tension stresses in the portion above the neutral axis or the tension section are very substantial, while the compression section stresses in the body portion below the neutral axis are also high. The neutral axis may be defined as that section of the belt wherein neither compression nor tension is imposed as the belt turns over a pulley of small diameter. Therefore, the neutral axis section may be considered as the primary load bearing region of the belt.

Belts of the type under consideration generally run over pulleys of small diameter and are therefore subjected in service to repeated flexing. It is the usual practice in constructing these belts to apply a layer of bias-laid heavy duck fabric in the bottom of the compression section. The function of this fabric layer is to protect the compression section and to guide the belt in the pulley grooves. It has been found, however, that this bias fabric has a tendency to stiffen the bottom of the belt and thus reduce its flexibility. The use of bias fabric also imparts to the belt a tendency to distort helically following the bias angle of the fabric. This tendency contributes to the instability of the belt during service and increases the torsional strain within the belt during flexing.

In accordance with the present invention it has been discovered that the disadvantages of using bias fabric in the base of the belt may be eliminated while at the same time retaining the useful functions of this fabric. This has been accomplished by the elimination of bias fabric for this purpose and the use in place thereof of spaced transverse cords at the bottom of the belt adhered or incorporated at the base of the compression section. These cords are positioned transversely to the longitudinal axis of the belt and are incorporated by laying cords, preferably in the form of cord fabric, in the base of the belt. It has been found that the use of these transverse cords will impart increased flexibility to the belt while at the same time increasing the crosswise rigidity of the belt at its base. The resulting belt has been found to function in an improved manner over small pulleys and will permit the use of softer compounds in the belt as the result of the increase in rigidity which these cords impart. Furthermore, any tendency in the belt to bend helically has been substantially eliminated with the result that the product is free from torsional strain ordinarily encountered in the use of bias fabric. These advantages are particularly noticeable in what are known as "narrow" raw edge belts. In these "narrow" belts, the width of the belt at the top is less than the thickness of the belt. In these belts the compression section is necessarily quite narrow and the use of teeth to increase flexibility is frequently not desirable due to the fact that too great a proportion of the compression section would have to be removed with resultant loss in strength. The teeth will also tend to shear off in use. It has been found that a substantial increase in flexibility will be provided by the incorporation of transverse cords in the base of the belt in the manner described herein.

Figure 2:
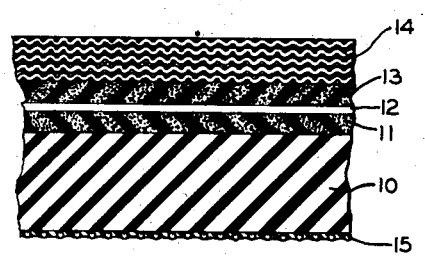

The nature of the invention will be more fully understood from the following description taken in connection with the accompanying drawing, wherein Fig. 1 illustrates a vertical cross section taken through a typical belt made in accordance with the present invention. Fig. 2 is a partial longitudinal cross section taken vertically along the longitudinal axis of the belt.

In the drawing the compression section is indicated by reference numeral 10. The neutral axis section is composed of a layer of spaced longitudinal cords 12 surrounded on each side by gum cushion layers 11 and 13. Tension section 14 is composed of a plurality of layers of bias fabric. In the base of the belt vulcanized to the bottom of the compression section is a layer of spaced transverse cords 15. These cords are preferably coated with or embedded in a thin layer of rubber as shown.

The belt is constructed in a conventional manner except that in place of the bias fabric base layer, a layer of transverse cords is applied to the building drum before the application of the compression layer. Generally these cords are in the form of a calendered rubber-impregnated cord fabric which may be frictioned and skimmed on one or both sides. The cord fabric may contain picks or may be of the well known pickless type. The cords in the base are generally spaced apart a desired distance. This may in general range from 1/64 in. to 1/4 in., although in some cases may be contiguous. The cord diameters will generally preferably range from 0.025 in. to 0.050 in. Various types of cord fabrics may be used and as one typical example, rayon cord fabric in which the cords are composed of 2200 denier 2 ply rayon having 25 to 35 ends per inch and which has been frictioned and skimmed to give a layer of .042 in. in thickness, may be utilized as the base layer.

A typical raw edge belt may be made as follows:

A layer of base cord fabric of the type referred to above is wound on a building drum. This fabric has been frictioned on two sides and skim coated on one side with a compounded vulcanizable crude rubber stock. A layer of compression stock is then applied to the base layer. This may, for example, consist of 0.200 gauge Stiflex which contains approximately 10 percent by weight of ground up rag fibers. These fibers have been incorporated by milling and the stock has been calendered to more or less align the fibers. The sheet is applied so that the fibers run substantially transverse to the longitudinal axis of the belt. The bottom cushion layer is then applied. This may be 0.031 gauge crude rubber or the like. The neutral axis cord layer is then superimposed upon the cushion. This layer may be of 2200 denier 5 ply rayon cord which has been dipped in a resorcinol-formaldehyde-latex composition to increase adherence to rubber. The top cushion of 0.015 gauge crude rubber is then wound over the neutral axis. The tension layer which may consist of 7 plies of cotton bias fabric frictioned on both sides with a rubber friction stock, is next applied. This layer has a thickness of about 0.125 in. The assembly is then rag wrapped and cured in open steam at a temperature of 275° F. to 300° F. After curing the wrapping is removed and the belt sleeve is mounted in a cutting machine in order to cut the belt rings from the sleeve. Inclined knives are utilized to obtain the V shape cross section. The resulting belts were found to be highly flexible and to have greater durability and stability in service.

The various layers of which the belt is formed may be composed or impregnated with either natural or synthetic rubbers depending upon the exact requirements for the belt. Synthetic rubbers of the chloroprene polymer type, such as, neoprene, and the buna type, such as butadiene-styrene or butadiene-acrylic nitrile copolymer, are generally utilized either alone or admixed with natural rubber, or with each other. In place of rayon cord either cotton or nylon may also be used where desired.

I claim:

1. A V-type raw-edged rubber belt having improved flexibility, stability, and crosswise rigidity in the base which comprises a tension section comprising a plurality of layers of rubberized bias fabric, an intermediate neutral axis section comprising parallel spaced longitudinally extending cords embedded in a rubber composition, a rubber compression section, and a protecting and stabilizing layer of spaced parallel rubberized cords extending transversely to the longitudinal axis of the belt and adhered across the base of the compression section and forming the bottom surface of the belt.

2. A belt according to claim 1 wherein the cords in the layer forming the bottom surface of the belt have a diameter in the range of about 0.025 in. to 0.050 in.

3. A belt according to claim 1 wherein the belt is of the narrow type in which the depth thereof is greater than the width.

ABRAHAM LINCOLN FREEDLANDER.

References Cited in the file of this patent

UNITED STATES PATENTS

| Number | Name | Date |
|---|---|---|
| 1,920,482 | Toulmin, Jr. | Aug. 1, 1933 |
| 1,970,509 | Dewein et al. | Aug. 14, 1934 |

FOREIGN PATENTS

| Number | Country | Date |
|---|---|---|
| 365,292 | Great Britain | Jan. 21, 1932 |